Figure 10:
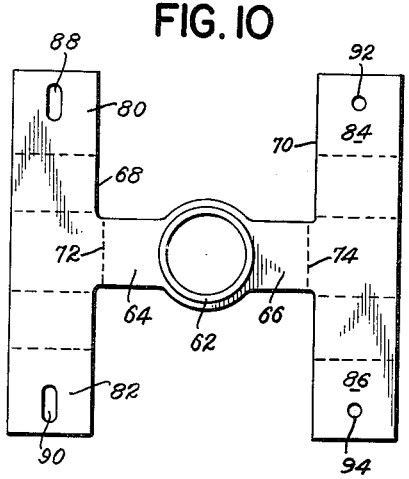

Aug. 23, 1960
L. T. PEYSER ET AL
2,949,618
COMBINED TAP AND DEBURRING CUTTER HAVING CUTTER
RESILIENTLY INTERLOCKED WITH TAP FLUTES
Filed July 10, 1957
2 Sheets-Sheet 1
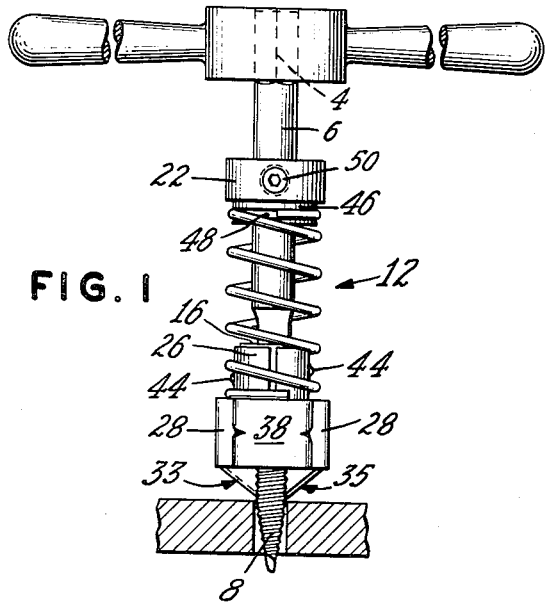
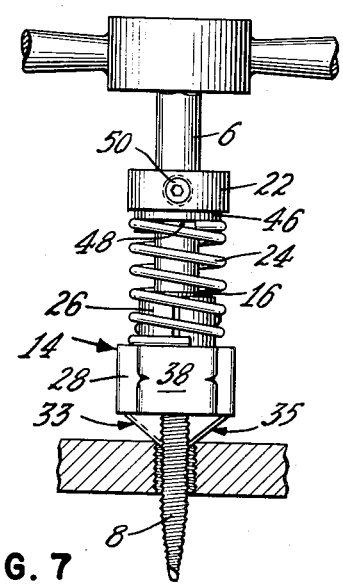
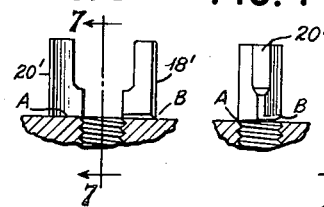
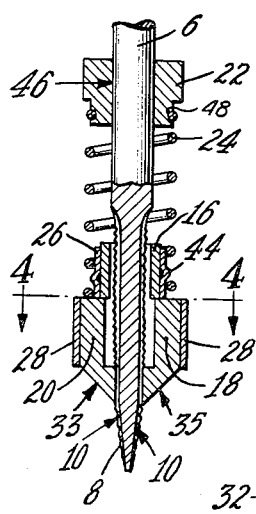
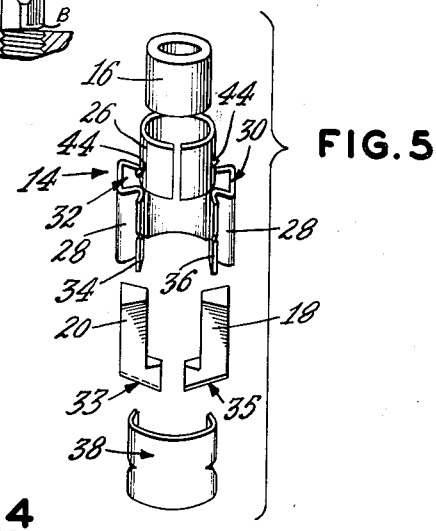
INVENTORS
LEONARD PEYSER
BY WILLIAM HALPERN
Robert C. Sullivan
ATTORNEY Aug. 23, 1960 L. T. PEYSER ET AL 2,949,618
COMBINED TAP AND DEBURRING CUTTER HAVING CUTTER
RESILIENTLY INTERLOCKED WITH TAP FLUTES
Filed July 10, 1957 2 Sheets-Sheet 2

INVENTORS
LEONARD PEYSER
WILLIAM HALPERN
BY Robert C. Sullivan
ATTORNEY

United States Patent Office 2,949,618
Patented Aug. 23, 1960

2,949,618

COMBINED TAP AND DEBURRING CUTTER HAVING CUTTER RESILIENTLY INTERLOCKED WITH TAP FLUTES

Leonard T. Peyser, White Plains, and William Halpern, Harrison, N.Y., assignors to Vernon Devices, Inc., Mount Vernon, N.Y., a corporation of New York Filed July 10, 1957, Ser. No. 671,101

14 Claims. (Cl. 10—140)

This invention relates to a tool which is operable in conjuction with a threaded tap to deburr a tapped hole during one complete cycle of operation of the tap.

It is recognized in the machine tool art that as a threaded tap cuts into a bored hole a thread or burr is raised at the peripheral leading edge of the hole that is being tapped. This thread must be removed in order to comply with material specifications and to prevent the possibility of a burr blocking entrance to the tapped hole.

Admittedly, combined tapping and deburring tools are known in the art, but an improved deburring tool of this type is required in view of the fact that the deburring tool ordinarily is driven by the flutes of the tap; i.e. the cutting blades extend radially into the flutes of the tap. It is because of this interlocking relationship and in view of the fact that all taps of the same size do not have the same flute depth that it is necessary to try several deburring tools in order to find one that will fit or interlock with the tap. Accordingly, it is a first object of this invention to provide an improved deburring tool which is cooperable with a threading tap to deburr a hole during one complete cycle of the tap.

It is a further object of this invention to provide an improved deburring tool which will fit any tap of a given size.

Since deburring tools must be concentric with respect to the tap in order to provide optimum deburring operation, it is generally accepted in industry that a separate deburring tool is required for each tap size. Obviously, this increases the cost of production and storage, but as a further object of this invention, provision is made for using one deburring tool with a range of tap sizes.

It is a still further object of this invention to provide an improved deburring tool having radially flexible components which vary in conformity with variations or irregularities in a single tap.

It is a still further object of this invention to provide an improved deburring element which is simple in construction and which is suitable for mass production.

Further objects and advantages of this invention will become apparent and will be better understood by reference to the following description and the accompanying drawings, and the features of novelty which characterize this invention will be pointed out with particularity in the claims annexed to and forming a part of this specification.

Figure 13:
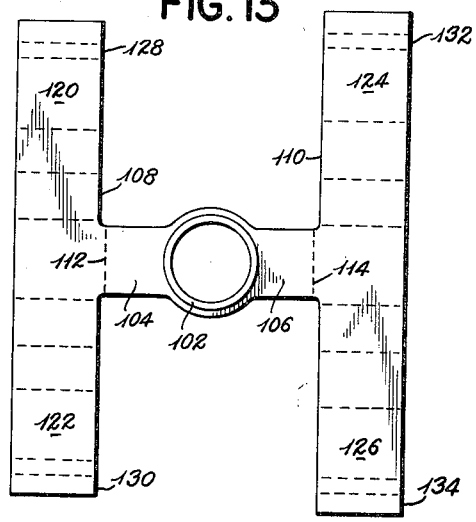
Figure 8:
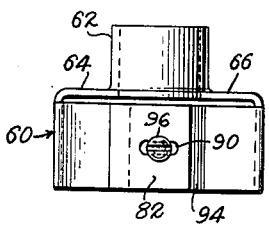
Figure 11:
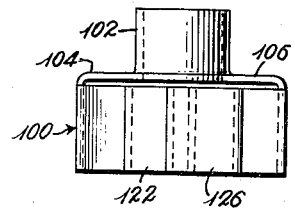
Figure 9:
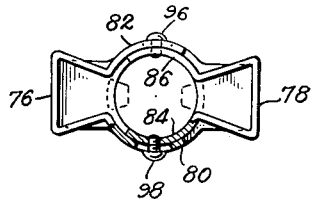
Figure 12:
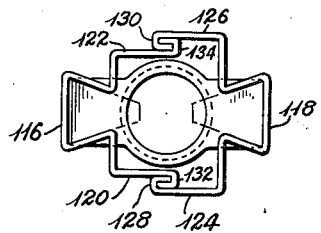

In the drawings, Fig. 1 is a front elevation of the deburring tool shown in conjunction with a tap as the tap is about to enter a hole in a plate; Fig. 2 is a front elevation showing the relationship of the elements of the deburring tool with respect to the tap after the tap has cut a thread on the hole; Fig. 3 is a sectional view taken through the tap and the deburring element; Fig. 4 is a top view taken through plane 4—4 of Fig. 3 in the direction of the arrows; Fig. 5 is an exploded view of the elements of the deburring tool; Fig. 6 is an elevation view of a modified pair of cutting blades used for spot facing; Fig. 7 is a view along line 7—7 of Fig. 6; Fig. 8 is an elevation view of a modified deburring tool body member having a locking type adjustment; Fig. 9 is a bottom plan view of the body member of Fig. 8; Fig. 10 is a plan view of a die-stamped blank used in making the modified body member of Figs. 8 and 9, the blank being shown before bending to final form; Fig. 11 is an elevation view of another modified deburring tool body member of one-piece construction having resiliently interlocking ends; Fig. 12 is a bottom plan view of the body member of Fig. 11; and Fig. 13 is a plan view of a die-stamped blank used in making the modified body members of Figs. 11 and 12, the blank being shown before bending to final form.

Briefly, this invention relates to an improved deburring tool for use in conjunction with a tap wherein the deburring tool, which is equipped with an interchangeable guide bushing, comprises a body portion made of spring steel adapted to permit radial expansion while positioning a plurality of cutting blades in driving relation with the flutes of a tap, whereby the deburring tool is suitable to fit any tap of a given size.

In the drawing, a threaded tap 2 is shown comprising the usual square driving end 4, a shank 6, and a threaded cutter 8 having axially extending flutes 10 which accommodate chips produced during a thread cutting operation.

The improved deburring tool 12 which is shown mounted coaxially of tap 2 comprises a tool body 14 concentrically surrounding a bushing 16 and supporting a pair of diametrically opposed cutting blades 18, 20; a collar 22; and a spring 24 which biases said collar and body axially apart.

The body 14, as illustrated in Fig. 5, is stamped or blanked in one piece from a strip of spring steel, and then shaped to form a substantially cylindrical or split-ring neck 26 and a coaxial, contiguous blade holder 28 which is integral with the neck 26 along a common portion of their peripheral edges. The blade holder 28 is shaped to include a pair of diametrically opposed pockets 30, 32 which, in a preferred embodiment, have trapezoidal cross sections to accommodate, in nesting relationship, the cutting blades 18, 20 which, as later described, have cross sections complementary to those of the pockets. The blade holder 28 is further shaped so that its terminal edges are formed into a pair of hook edges 34, 36.

Since the tool body is formed of spring steel, it can be said that the blade holder portion has a normal shape which may be deformed radially outwardly (and naturally radially inwardly too). In order to control the radial outward deformation, a removable resilient clip 38, which in a preferred embodiment is longitudinally expandable, is equipped with complementary hook portions 40, 42 which interlock with the hook-shaped terminal edges 34, 36 of the blade holder 28.

With this construction of parts, it is obvious that the cutting blades 18, 20 are radially displaceable to conform with the contours of the flutes, and at the same time they are held resiliently in contact with the tap flutes because of the resilient properties of the blade holder 28 fortified by the clip 38. This relationship exists for the installation of the tap in the deburring tool, and during their relative axial movements which take place in a tapping cycle, as later described.

The blades 18 and 20 each have body portions shaped in cross section to conform with the shape of the pockets in the blade holder 28. The blades also are equipped with radially inwardly extending cutting edges 33, 35 at one end. Because of their conforming shape, the blades are axially slidable into pockets 30, 32, respectively, of the blade holder, and the limit of their axial insertion is determined when the blade end opposite the cutting edge strikes the neck 26. To accomplish this, the cutting blade bodies have radial dimension (e.g. radial when in the pockets) great enough to extend radially inwardly through the truncated apex of the pockets to underlie the neck 26.

After cutting blades 18, 20 have been assembled in the pockets 28, 32 respectively, the bushing 16 is axially inserted into the neck 26, whereby spring 24 is installed over the neck 26, which incidentally is equipped with raised portions 44 that lie between concentric convolutions of the spring when assembled to restrain axial separation. The collar 22, which has a central bore 46 for receiving tap shank 6, has a circumferential groove 48 or similar means for engaging the opposite end of the spring to hold the parts axially together. The collar 22 has a setscrew 50 for locking the collar to the tap shank.

When the deburring tool has been assembled, the tap is inserted axially through the collar bore and through the center of spring 24, and thence through the central bore of the bushing 16. A this point, the tap must be rotated until its flutes are in alignment with the cutting blades 18, 20, whereupon the tap can be passed down between the cutting blades with their inner edges lying within the flutes of the tap. It is obvious that this interrelationship of the cutting blades and the flutes will provide a driving arrangement whereby as the tap is rotated it will engage the cutting blades to drive the deburring tool. When the collar 22 is secured by setscrews to the tap shank, there will be no torsion on the spring 24. Incidentally, the collar 22 is positioned axially along the tap shank in such a manner that a suitable compressive force is produced in the spring 24 at the end of a tapping cut; i.e., as the tap enters a hole, the cutting blades will engage the leading peripheral edge of the hole, thereby axially displacing the blade holder 28 from the Fig. 1 to the Fig. 2 position In a preferred embodiment, the cutting edges of the cutting blades 18, 20 are arranged so that they will not cut as the tap enters the hole, but instead will slide easily along the leading peripheral edge, but then will cut as the tap is unscrewed from the hole; i.e., spring 24 exerts an axial pressure which causes the cutting edges to remove the raised burr as the tap is unscrewed from the hole to complete a tapping cycle.

It was mentioned that one of the objects of this invention was to provide a deburring tool which had interchangeable parts adapting it for cooperation with taps of various sizes. To accomplish this objective, the bushing 16, which has an outer diameter conforming to that of the neck 26 of the deburring tool, can be provided with an internal bore of a size to match any one of a range of tap sizes, e.g., 2 through 10. It has been found that cutting tools 18, 20 which fit any one of the range of sizes, e.g., tap size 2, will accommodate the flutes of the total range of sizes 2 through 10.

*Spot facing*

It has been found that by squaring the cutting edges of blades 18, 20 to provide a cutter surface parallel to and engageable with the workpiece surface adjacent the tapped hole, the deburring tool will work very satisfactorily for a spot facing operation; i.e., it will provide a surface squared to the axis of the tapped hole. The cutters 18' and 20' shown in Figs. 6 and 7 are provided with squared cutting edges suitable for spot facing. The leading edges A of each cutting blade spot face the upper surface of the workpiece on counterclockwise rotation. The counterclockwise trailing edge B of each blade 18', 20' is beveled so that it will not cut on clockwise rotation of the cutting blade.

There is shown in Figs. 8, 9 and 10 a modified deburring tool body member generally indicated at 60 characterized by an adjustable locking construction for maintaining the body member at a size which holds the cutter blades in engagement with the flutes of the tap member. Body member 60 is formed by bending the die-stamped spring metal blank shown in Fig. 10. The die-stamped blank shown in Fig. 10 has been shaped to include an upstanding split ring neck portion 62 from the base of which extend web portions 64 and 66. Strip portions 68 and 70 extend on either side of the outer ends of web portions 64 and 66, portions 64, 66, 68 and 70 initially all lying in the same plane. To form body member 60, strip portions 68 and 70 are bent downwardly vertically along the respective dotted lines 72 and 74. Strip portions 68 and 70 are then bent along the dotted lines shown in Fig. 10 to form the pockets 76 and 78 which receive the cutter blades. In the completed body member, the outer end portions 80 and 82 of strip 68 respectively overlap the corresponding end portions 84 and 86 of strip 70. End portions 80 and 82 are provided with slotted openings 88 and 90 which overlie screw holes 92 and 94 of strip 70. Screw 96 is received through slot 90 and screw hole 94 at the front of the body member, while screw 98 is received through slot 88 and screw hole 92 at the back of the body member. The size of pockets 76 and 78 may be adjusted by adjusting the position of the slots and screw holes relative to each other and locking the pockets at a desired adjustment by means of screws 96 and 98. If desired, the locking adjustment may be provided on only one side of the body member, such as the front or back, and the overlapped wall portions at the opposite side may remain fixed with respect to each other. The locking adjustment just described permits the pockets 76 and 78 to accommodate deburring cutter blades to flutes of various sizes.

There is shown in Figs. 11, 12 and 13 a modified deburring tool body member generally indicated at 100 which is resiliently locked without the use of a clip member such as clip 38 of the embodiment of Figs. 1–7. Body member 100 is formed by bending the die-stamped spring metal blank shown in Fig. 13. The die-stamped blank shown in Fig. 13 has been shaped to include the upstanding split-ring neck portion 102 from the base of which extend web portions 104 and 106. Strip portions 108 and 110 are connected to the outer ends of web portions 104 and 106, portions 104, 106, 108, and 110 initially all lying in the same plane. To form body member 100, strip portions 108 and 110 are bent downwardly vertically along the respective dotted lines 112 and 114. Strip portions 108 and 110 are then bent along the dotted lines shown in Fig. 13 to form the pockets 116 and 118 which receive the cutter blades. The outer end portions 132 and 134 of strip 110 are bent to form hooks which interlock with correspondingly-shaped hooks formed by bending the end portions 128 and 130 of strip 108. The interlocked hooked ends 128–132, 130–134 form a resilient interlocked engagement which holds body member 100 in closed position by the resilient properties of the spring metal used in forming the body member. At the same time, the resilient characteristics of the body member permit radial deflection of pockets 116 and 118 to accommodate the cutting blades to variations in flute sizes.

In the modified body members shown in the embodiments of Figs. 8–10, inclusive, and Figs. 11–13, inclusive, the respective neck portions 62 and 102 receive a bushing having an outer diameter corresponding to that of the respective neck portion and an internal bore of a size to match that of any one of a range of tap sizes, as described in connection with the embodiment of Figs. 1–7, inclusive.

While the various embodiments of the invention have been shown and described as used in connection with a tap member having two flutes, obviously it is within the scope of the invention to apply the deburring tool of the invention to taps having a different number of flutes, such as three or four fluted taps.

The deburring tools hereinbefore described obviously have great utility since a given tool can be used with a wide range of tap sizes. All of the deburring tool embodiments hereinbefore described permit the use of hard centered alloy bits as well as high speed steel bits.

While there have been shown and described particular embodiments of the invention, it will be obvious to those skilled in the art that various changes and modifications may be made therein without departing from the invention and, therefore, it is aimed to cover all such changes and modifications as fall within the true spirit and scope of the invention.

What we claim as new and desire to secure by Letters Patent of the United States is:

1. A deburring tool for use in conjunction with a threaded tap having axially extending flutes comprising a tool body having a blade holder defining a central axial bore for accommodating a threaded tap in concentric relationship, said blade holder being mounted on the tap concentrically thereof for sliding axial movement thereon, a spring means coaxially positioned about the tap, one end of said spring means engaging an end of said blade holder which is contiguous the shank portion of the tap, the opposite end of said spring means being adjustably fixed to the shank portion of the tap, whereby said spring means urges said blade holder toward the threaded end of the tap, said blade holder being made of a resilient material having a normal shape which may be deformed radially outwardly, a plurality of cutting blades supported by said blade holder to be maintained thereby resiliently in interlocking engagement with the flutes of said tap to provide a driving relationship therewith, said blade holder including abutment means limiting axial movement of said cutting blades in the direction of the shank end of the tap, and means maintaining said blade holder in a position in which the cutting blades are seated against the flutes of the tap.

2. A deburring tool for use in conjunction with a threaded tap having axially extending flutes comprising a tool body having a neck and a blade holder arranged in coaxial juxtaposition with each defining a central axial bore for accommodating said tap in concentric relationship, said blade holder being mounted on the tap concentrically thereof for sliding axial movement thereon, a spring means coaxially positioned about the tap, one end of said spring means embracing said nock, the opposite end of said spring means being adjustably fixed to the shank portion of the tap, whereby said spring means urges said blade holder toward the threaded end of the tap, said blade holder being constructed of resilient material having a normal position which may be deformed radially outwardly, a plurality of cutting blades supported by said blade holder to be maintained thereby resiliently in interlocking engagement with the flutes of said tap to provide a driving relationship therewith, said neck limiting axial movement of said cutting blades in the direction of the shank end of the tap, and means maintaining said blade holder in a position in which the cutting blades are seated against the flutes of the tap.

3. A deburring tool for use in conjunction with a threaded tap having axially extending flutes comprising a tool body having a blade holder defining a central axial bore for accommodating a threaded tap in concentric relationship, said blade holder being mounted on the tap concentrically thereof for sliding axial movement thereon, a spring means coaxially positioned about the tap, one end of said spring means engaging an end of said blade holder which is contiguous the shank portion of the tap, the opposite end of said spring means being adjustably fixed to the shank portion of the tap, whereby said spring means urges said blade holder toward the threaded end of the tap, said blade holder being made of a resilient material having a normal position which may be deformed radially outwardly, a plurality of cutting blades supported by said blade holder to be maintained thereby resiliently in interlocking engagement with the flutes of said tap to provide a driving relationship therewith, said blade holder including abutment means limiting axial movement of said cutting blades in the direction of the shank end of the tap, and resilient clip means urging said blade holder towards its normal position.

4. A deburring tool for use in conjunction with a threaded tap having axially extending flutes comprising a tool body having a blade holder defining a central axial bore for accommodating a threaded tap in concentric relationship, said blade holder being mounted on the tap concentrically thereof for sliding axial movement thereon, a spring means coaxially positioned about the tap, one end of said spring means engaging an end of said blade holder which is contiguous the shank portion of the tap, the opposite end of said spring means being adjustably fixed to the shank portion of the tap, whereby said spring means urges said blade holder toward the threaded end of the tap, said blade holder being made of a resilient material having a normal position which may be deformed radially outwardly, said tool body comprising a one-piece spring steel blank shaped to define a plurality of pockets having axes parallel to and concentric with respect to the axis of said tool body, a plurality of cutting blades nested in the pockets of said tool body for resilient interlocking engagement with the flutes of said tap to establish a driving relationship therewith, said blade holder including abutment means limiting axial movement of said cutting blades in the direction of the shank end of the tap, and resilient clip means restraining radial expansion of said blade holder.

5. A deburring tool for use in conjunction with a threaded tap having axially extending flutes comprising a tool body having a neck and a blade holder arranged in coaxial juxtaposition with each other and defining a central axial bore for accommodating said tap in concentric relationship, said blade holder being mounted on the tap concentrically thereof for sliding axial movement thereon, a spring means coaxially positioned about the tap, one end of said spring means embracing said neck, the opposite end of said spring means being adjustably fixed to the shank portion of the tap, whereby said spring means urges said blade holder toward the threaded end of the tap, said blade holder being constructed of a resilient material having a normal position which may be deformed radially outwardly, said tool body comprising a one-piece spring steel blank shaped to form said neck into a split collar and to define a plurality of pockets in said blade holder having axes parallel to and concentric with respect to the axis of said tool body, a plurality of cutting blades nested in the pockets of said blade holder and in interlocking engagement with the flutes of said tap, said neck limiting axial movement of said cutting blades in the direction of the shank end of the tap, and resilient clip means restraining radial expansion of said blade holder thereby urging said cutting blades resiliently into interlocking engagement with said tap flutes for driving relationship therewith.

6. A deburring tool as defined in claim 2 in which said cutting blades have a surface parallel to and engageable with the surface of the workpiece surrounding the tapped hole for spot facing the surface of the workpiece.

7. A deburring tool for use in conjunction with a threaded tap having axially extending flutes comprising a tool body having a neck and a blade holder arranged in coaxial juxtaposition with each defining a central axial bore for accommodating said tap in concentric relationship, said blade holder being mounted on the tap concentrically thereof for sliding axial movement thereon, a spring means coaxially positioned about the tap, one end of said spring means embracing said neck, the opposite end of said spring means being adjustably fixed to the shank portion of the tap, whereby said spring means urges said blade holder toward the threaded end of the tap, said blade holder being constructed of resilient material having a normal position which may be deformed radially outwardly, cutting blades supported by said blade holder, said neck limiting the axial movement of said cutting blades in the direction of the shank end of the tap, and means restraining said blade holder against radial expansion whereby said cutting blades are urged into interlocking engagement with flutes of a tap received by said tool body.

8. A deburring tool for use in conjunction with a threaded tap having axially extending flutes comprising a tool body having a blade holder defining a central axial bore for accommodating a threaded tap in concentric relationship, said blade holder being mounted on the tap concentrically thereof for sliding axial movement thereon, a spring means coaxially positioned about the tap, one end of said spring means engaging an end of said blade holder contiguous the shank portion of the tap, the opposite end of said spring means being adjustably fixed to the shank portion of the tap, whereby said spring means urges said blade holder toward the threaded end of the tap, said blade holder comprising a one-piece spring metal blank shaped to define a plurality of pockets having axes parallel to and concentric with respect to the axis of said tool body, a plurality of cutting blades nested in the pockets of said tool body, said blade holder including abutment means limiting axial movement of said cutting blades in the direction of the shank end of the tap, and means for holding said pockets in an adjustably fixed position to engage said cutting blades in interlocking engagement with the flutes of said tap.

9. A deburring tool for use in conjunction with a threaded tap having axially extending flutes comprising a one-piece metal blank shaped to define a tool body including a neck and a blade holder arranged in coaxial juxtaposition with each other and defining a central axial bore for accommodating a tap in concentric relationship, said blade holder being mounted on the tap concentrically thereof for sliding axial movement thereon, a spring means coaxially positioned about the tap, one end of said spring means embracing said neck, the opposite end of said spring means being adjustably fixed to the shank portion of the tap, whereby said spring means urges said blade holder toward the threaded end of the tap, said blade holder including a plurality of blade-receiving pockets lying outwardly of said central axial bore, cutting blades supported by said blade holder, said neck limiting axial movement of said cutting blades, said tool body terminating in a pair of end portions respectively directed in opposite directions peripherally of said tool body, and means connecting said end portions to each other to close said tool body upon itself.

10. A deburring tool as defined in claim 9 in which said means connecting said end portions is a resilient clip member.

11. A deburring tool as defined in claim 9 in which said means connecting said end portions is adjustable to permit adjustment of the position of said end portions relative to each other.

12. A deburring tool for use in conjunction with a threaded tap having axially extending flutes comprising a one-piece metal blank shaped to define a tool body including a neck and a blade holder arranged in coaxial juxtaposition with each other and defining a central axial bore for accommodating a tap in concentric relationship, said blade holder being mounted on the tap concentrically thereof for sliding axial movement thereon, a spring means coaxially positioned about the tap, one end of said spring means embracing said neck, the opposite end of said spring means being adjustably fixed to the shank portion of the tap, whereby said spring means urges said blade holder toward the threaded end of the tap, said blade holder being constructed of a resilient material having a normal position which may be deformed radially outwardly, and including a plurality of blade-receiving pockets lying outwardly of said central axial bore, cutting blades supported by said blade holder, said neck limiting axial movement of said cutting blades, said tool body terminating in a pair of end portions respectively directed in opposite directions peripherally of said tool body, and means connecting said end portions to each other to close said tool body upon itself.

13. A deburring tool as defined in claim 12 in which each of said end portions is provided with a hooked end which interlockingly engages the hooked end of the other end portion.

14. A deburring tool as defined in claim 12 in which said end portions are adjustably fixed with respect to each other.

References Cited in the file of this patent

UNITED STATES PATENTS

| | | |
|---|---|---|
| 1,041,675 | Robinson | Oct. 15, 1912 |
| 1,433,382 | Kiper | Oct. 24, 1922 |
| 1,501,117 | Johnson | July 15, 1924 |
| 2,767,412 | Berkey | Oct. 23, 1956 |